No. 652,310. Patented June 26, 1900.
O. P. HILL.
CORN HARVESTER.
(Application filed Jan. 29, 1900.)
(No Model.)
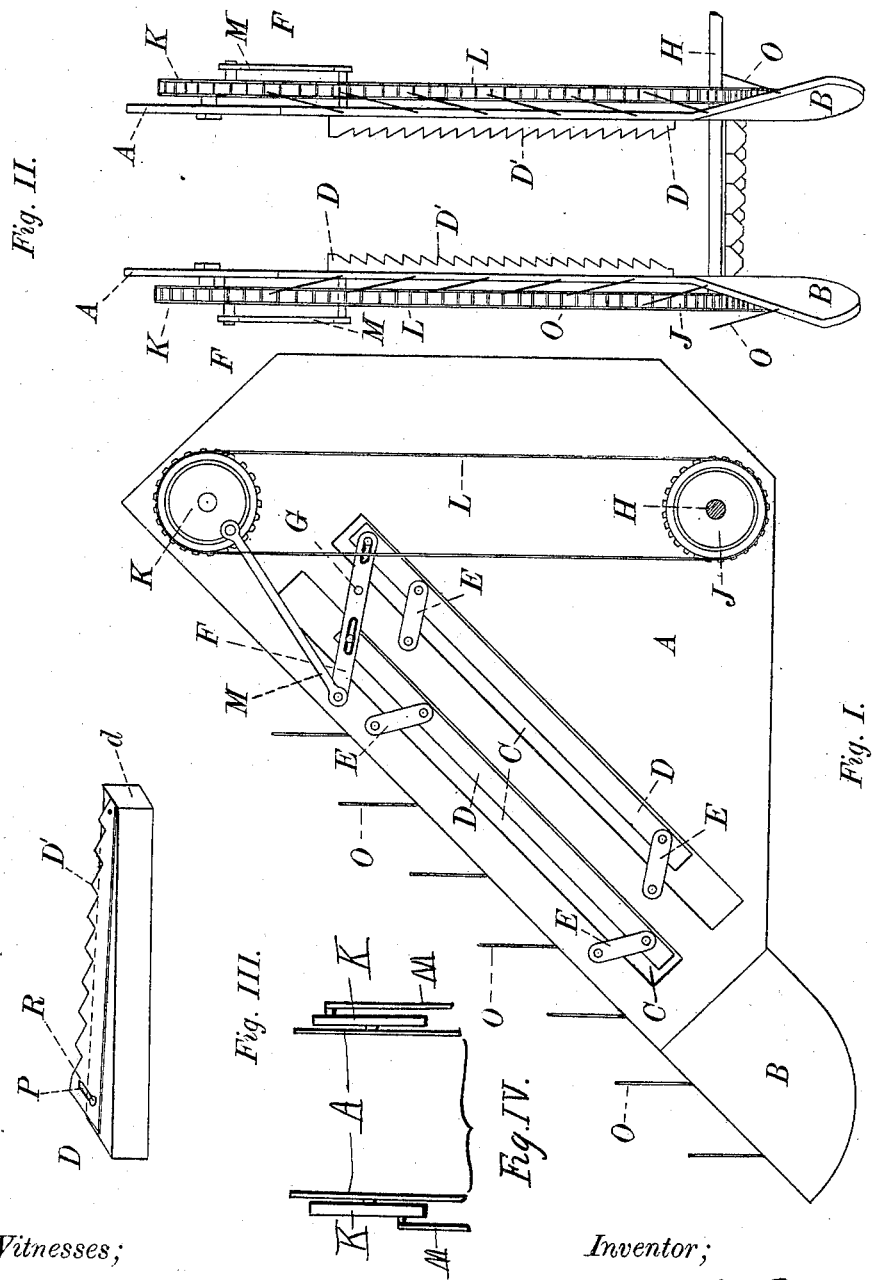
Witnesses;
Fred W. Honens,
J. B. Bossett.
Inventor;
Oley P. Hill,
by M. I. Manahan
his Attorney.

UNITED STATES PATENT OFFICE.

OLEY P. HILL, OF CAPRON, ILLINOIS.

CORN-HARVESTER.

SPECIFICATION forming part of Letters Patent No. 652,310, dated June 26, 1900.

Application filed January 29, 1900. Serial No. 3,185. (No model.)

*To all whom it may concern:*

Be it known that I, OLEY P. HILL, of Capron, Boone county, State of Illinois, have invented an Improvement in Corn-Harvesters, of which the following description, in connection with the accompanying drawings, is a specification.

My invention pertains especially to an improvement in the feeding-device attachment to the binder of the harvester, and has for its object the providing of a mechanism which will produce the same and better results than the present harvesters with less machinery, the substitution of my mechanism for the usual feeding-chains removing the objection now universally made of the pulling off of the ears of corn and leaving them in the field.

I illustrate my improvement in the accompanying drawings, in which—

Figure 1 is a side elevation of my feeding device. Fig. 2 is a front elevation of the same. Fig. 3 shows details of one of the feeding-jaws.

Similar letters refer to similar parts in the several views.

As the feeding device is composed of two sides which are duplicates with the exception that one is the right side and the other the left, I do not deem it necessary to refer to but one side in the detailed explanation.

A represents the frame of the side which is provided with the extension B. In the frame A are formed the elongated openings C, in which are operated the feeding-jaws D. The said jaws are toothed and are held in place by the links E. The rod or bar F is pivoted to the frame A at G and also to the feeding-jaws D at the points shown.

H is the rod from the driving mechanism of the binder, upon which is seated the gear-wheel J. The said rod extends to the opposite frame A and operates a duplicate wheel J. A similar gear-wheel K is seated in the upper part of the frame A and operated by means of the connecting-chain L. The rod H is suitably connected to the gear-wheel K by means of the pitman M. The corresponding pitman M on the opposite side A is so placed upon the corresponding gear-wheel K as to alternate the movement of the sets of feeding-jaws D.

The forward edge of the frame A is provided with steel rods O to assist in guiding the cornstalks toward the feeding-jaws aforesaid.

The feeding-jaws D are formed of a solid body *d*, preferably wood, upon one side of which is placed the toothed bar D', of iron or steel, as desired, the bar D' being pivoted at one end and made adjustable at the other by means of the slot P and the bolt R.

The operation of my invention is as follows: My feeder being placed upon the binding-table in the usual manner, the cutting-knife operates crosswise about centrally of its base. The sloping outward of the extensions B provides a guide for the stalks as they are pushed into the feeder in its progress across the field. The rods O assist in guiding the stalks between the sides of the frames A, where they are met by the upper members of each set of feeding-jaws, respectively, and immediately afterward by the second members. As before stated, the seating of pitmen M on opposite sides of the gears K alternates the movement of the sets of feeding-jaws, from which it is seen that the movement of the upper jaw on the right side corresponds in direction with that of the lower jaw on the left side. The result obtained is a gentle forcing of the stalks backward until they fall as they are cut by the knife upon the binding-table and the tearing off of the ears is avoided.

What I claim as my invention, and desire to secure by Letters Patent of the United States, is—

1. In a feeding device for a corn-harvester, the frames A, the slots C therein, the reciprocating jaws D seated in the slots C, the links E connecting the jaws D to the frames A, the rod F pivoted to the jaws D and the intermediate portion of the frame A between the slots C, and suitable driving mechanism for operating the same, substantially as shown and for the purpose specified.

2. In a feeding device for a corn-harvester and operated thereby, the frames A, the slots C therein, the reciprocating jaws D seated in the slots C, the links E connecting the jaws D to the frames A, the rod F pivoted to the jaws D and the intermediate portion of the frame A between the slots C, and suitable driving mechanism for operating the same, and the rods O on the frame A, substantially as shown and for the purpose described.

3. In a feeding device for a corn-harvester, the frames A, the slots C therein, the jaws D having an adjustable toothed blade or bar, the links E connecting the jaws D and frame A, the rod F pivoted to the frame and jaws, the pitman M, connected to and operated by the gear K, the gear K, the gear J upon the drive-rod of the machine, and the chain L to convey the power from the gear J to the gear K, and the rods O upon the frame A, substantially as shown and for the purpose specified.

In witness whereof I have signed my name to this specification in the presence of two subscribing witnesses.

OLEY P. HILL.

Witnesses:
  C. A. STEVENSON,
  I. E. STEVENSON.